United States Patent [19]

Sestak et al.

[11] Patent Number: 5,509,058
[45] Date of Patent: Apr. 16, 1996

[54] GLOBAL MANAGEMENT OF TELEPHONE DIRECTORY

[75] Inventors: Mark R. Sestak, Ottawa; Michael L. Wright; J. Lynn Fagan, both of Kanata, all of Canada

[73] Assignee: Mitel Corporation, Canada

[21] Appl. No.: 119,983

[22] Filed: Sep. 10, 1993

[30] Foreign Application Priority Data

Sep. 11, 1992 [CA] Canada ................... 2078045

[51] Int. Cl.$^6$ ............................................. H04M 7/00
[52] U.S. Cl. ..................... 379/201; 379/279; 379/242
[58] Field of Search ............................. 379/207, 201, 379/213, 92, 225, 279, 242

[56] References Cited

U.S. PATENT DOCUMENTS

| | | | |
|---|---|---|---|
| 4,348,554 | 9/1982 | Asmuth | 379/207 |
| 4,442,321 | 4/1984 | Stehman | 379/225 |
| 4,488,004 | 12/1984 | Bogart | 379/225 |
| 4,817,129 | 3/1989 | Riskin | 379/88 |
| 4,899,373 | 2/1990 | Lee | 379/207 |
| 5,046,188 | 9/1991 | Molnar | 379/94 |
| 5,220,596 | 6/1993 | Patel | 379/207 |
| 5,251,255 | 10/1993 | Epley | 379/207 |
| 5,255,310 | 10/1993 | Kim | 379/201 |
| 5,259,026 | 11/1993 | Johnson | 379/213 |
| 5,267,304 | 11/1993 | Slusky | 379/201 |

FOREIGN PATENT DOCUMENTS

0550178A2  7/1993  European Pat. Off. ......... H04Q 3/00

Primary Examiner—Jeffery Hofsass
Assistant Examiner—Scott Wolinsky
Attorney, Agent, or Firm—Charles E. Wands

[57] ABSTRACT

A method of maintaining directory data in a switching system network having plural switching systems and a centralized directory data management system in which local directory data is stored at each switching system, A copy of directory data of all the switching systems is stored at the management system. Directory data entries of the directory data stored at the management system are associated with groups of switching systems. Data entries associated within each group are downloaded to the switching systems designated in that group.

11 Claims, 2 Drawing Sheets

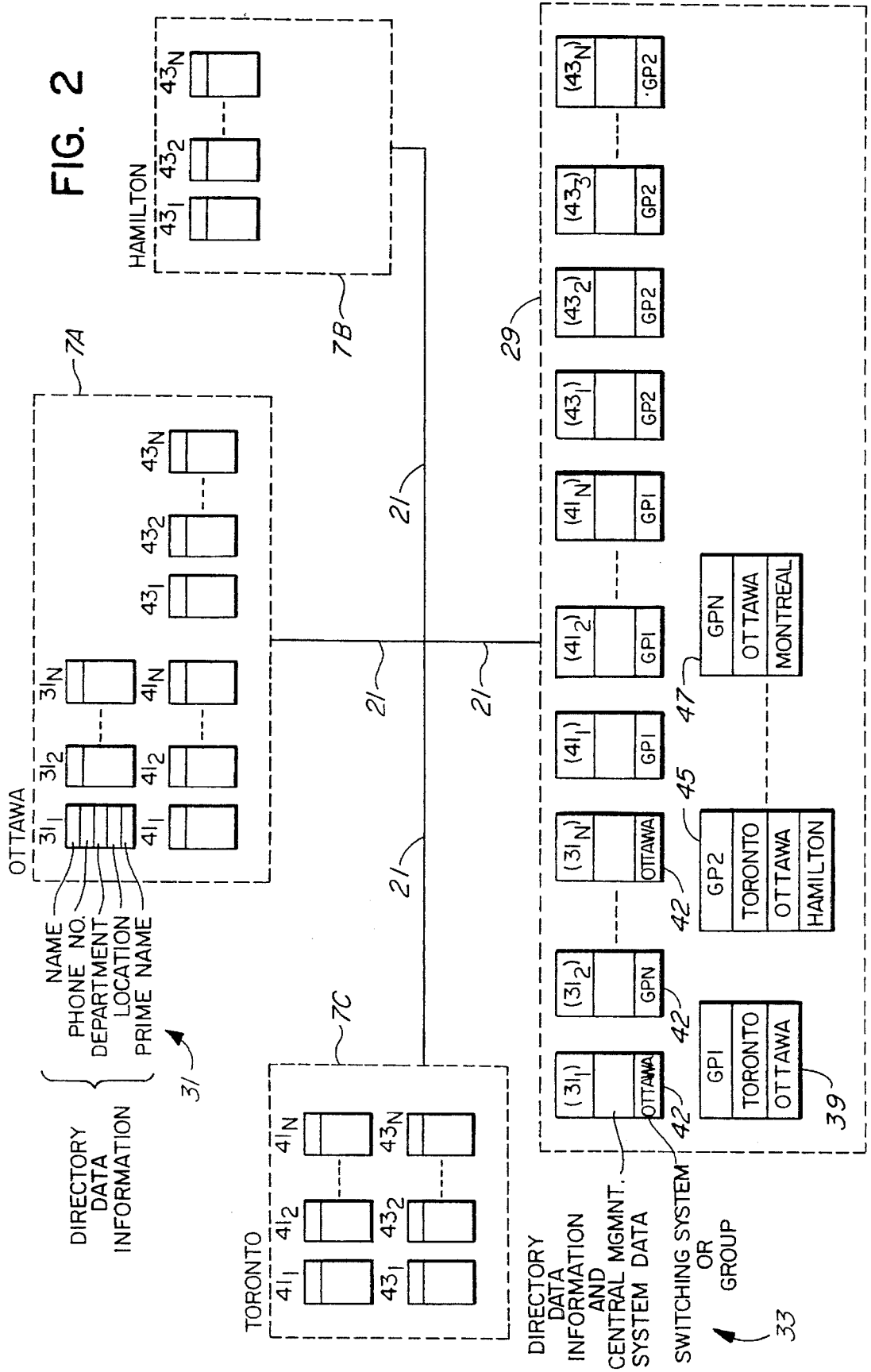

GLOBAL MANAGEMENT OF TELEPHONE DIRECTORY

FIELD OF THE INVENTION

This invention relates to switching systems and in particular to methods of management of a telephone directory used by plural telephone switching systems which are connected in network.

BACKGROUND TO THE INVENTION

Switching systems such as PABXs or central office switching systems offering special services are often networked. Some of those special services are speed call or call-by-name. While speed call and call-by-name services are well established within the confines and control of a single PABX, when a speed call or call-by-name directory entry is desired to be offered to users connected to more than one PABX, its management has been difficult.

For example, one type of such a network could utilize a central management system containing a list of all of the directory data entries of all the switching systems to which each is applied. The data entries relating to each designated switching system would be downloaded to the designated system. All changes, such as a move of a user to a different physical location would require modification of the entry at the central management system and downloading of new data to each affected switching system from the central location. This would require active control by an operator at the central management system location and individual control of the data entries at each specific switching system.

In another system the central control could avoid maintaining a copy of the directory data entry list, but instead keep separate lists only at each switching system. However in order to provide a common speed dial or dial by name facility to other switching systems, retrieval and retransmission of the relevant data would have to be effected from the central management system.

The above-noted systems would not facilitate the provision of common directory entries for various groups of switching systems connected in the network, in which each group could contain reference to some similarly identified switching systems. In other words "communities of interest" of the various directory data entries are not facilitated.

In addition, the above-described systems would not allow persons such as local telephone users or local telephone operators to make directory changes at a local switching system which automatically changes the corresponding data in all directories in all local switching systems in a particular community of interest on a global basis within the network.

The above-described systems do not facilitate an operator of a management system to make a directory change at the management system only once, resulting in change of all of the directory entries relating to that changed data entry in all switching systems in a community of interest of switching systems, at once.

SUMMARY OF THE PRESENT INVENTION

The present invention provides individual entries in a telephone directory to be applicable to one, multiple or all switching systems connected in the network. A central telephone directory groups data entries in communities of interest, with the data relating to a directory data entry being identical for each switching system contained within a community interest group.

In the present invention, local operators at each switching system can make telephone directory changes at their local switching systems, without requiring use of an operator at the central management system. The central management system recognizing a change, addition, or deletion, incorporates it into all corresponding data entries in each switching system within the community interest group.

A central management system operator can, at the management system, make telephone directory changes, once, from the central management system, and the central management system then automatically updates the corresponding data entries in each of the switching systems within the community of interest group.

It should be noted that a community of interest group can consist of only one switching system, plural switching systems which are fewer than all of those connected to the network, or can be all of the switching systems connected to the network. Various other groups can exist consisting of any of the above, e.g. a single switching system can appear in multiple groups.

To illustrate what is meant by a group, for example the user directory name "Fred" can be associated with telephone directory group "Ontario". "Ontario" contains the network switching systems "Ottawa" and "Toronto". The association, the group, thus indicates that "Fred" is referenced by both "Ottawa" and "Toronto" switching systems. Another group can be restricted only to "Ottawa", while still another group can consist of "Toronto" and "Hamilton".

In accordance with an embodiment of the invention, a method of maintaining directory data in a switching system network having plural switching systems and a centralized directory data management system is comprised of storing local directory data at each switching system, storing a copy of directory data of all the switching systems at the management system, associating directory data entries of the directory data stored at the management system with groups of switching systems, and downloading data entries associated with each group to the switching systems designated in that group.

BRIEF INTRODUCTION TO THE DRAWINGS

A better understanding of the invention will be obtained by reference to the detailed description below, in conjunction with the following drawings, in which:

FIG. 1 is a block diagram of a system in which the present invention can be carried out and FIG. 2 is a block diagram of memories of representative switching systems and of the management system, illustrating the data contained therein in accordance with an embodiment of this invention.

DETAILED DESCRIPTION OF THE INVENTION

Figure 1:
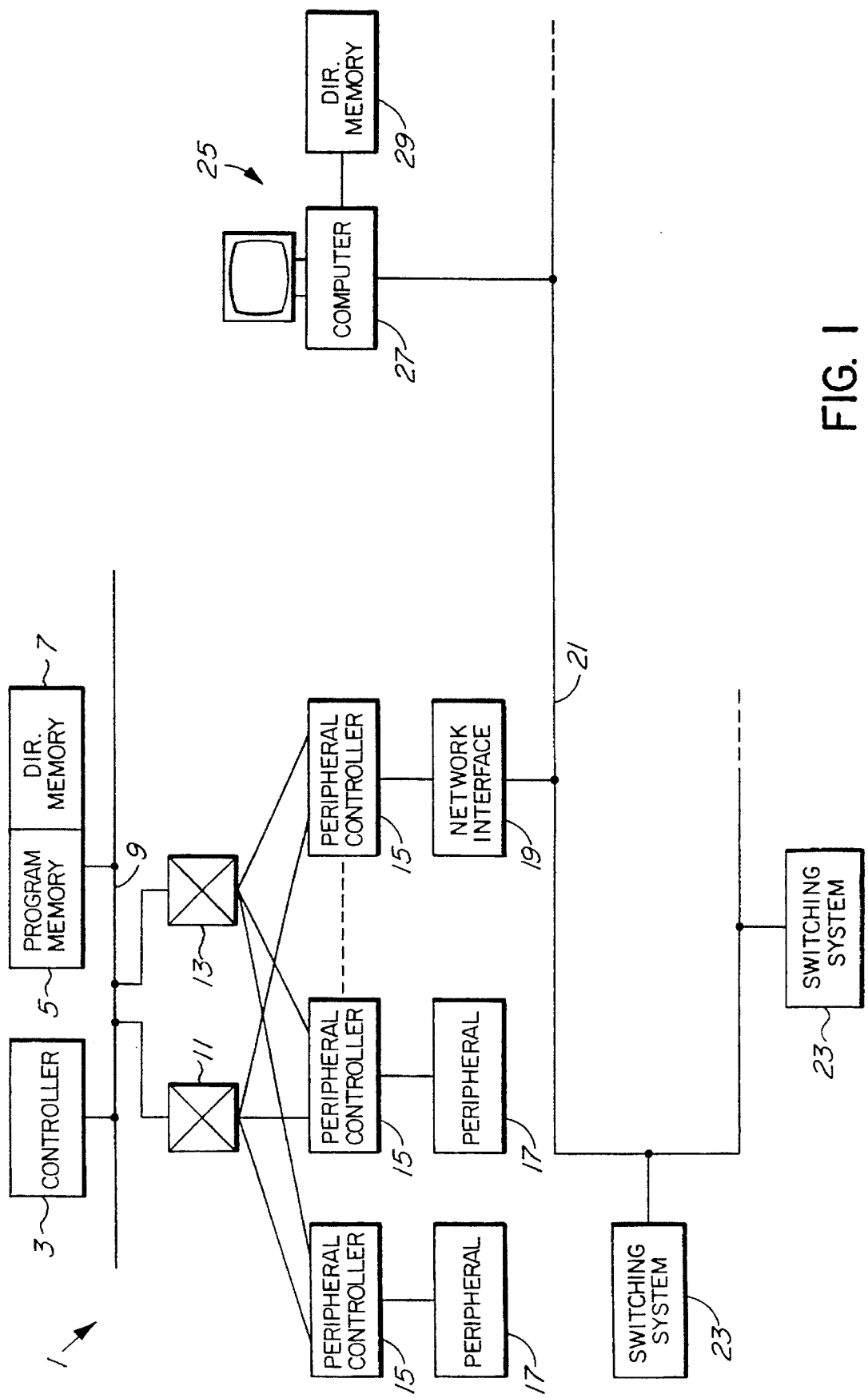

A representative switching system 1 is illustrated which, for the sake of description, is similar to the type SX2000 PABX sold by Mitel Corporation. Such a system is described in U.S. Pat. No. 4,615,028 issued Sep. 30, 1986 and U.S. Pat. No. 4,616,360 issued Oct. 7, 1986 and assigned to Mitel Corporation. However this invention can be applied to any other modern switching system which can be networked and which contains a local directory memory for use in providing special services such as call-by-name, etc.

Briefly, the SX2000 system contains a central controller 3 which is connected to a program memory 5, utilized to operate the switching system, and a directory memory 7, via a bus 9. A circuit switch 11 and a message switch 13 are connected to controller 3 via bus 9, and are also connected to peripheral controllers 15. Signals are transmitted to and are received from peripherals 17 which can be e.g. subscriber sets, trunks, etc. Network interface 19 is also connected to a peripheral controller 15 and to other switching systems 23 via network 21.

In general, communication is effected between peripherals and between peripherals and the network via peripheral controllers 15 and switches 11 and 13.

Directory memory 7 contains a directory comprised of data to which, e.g. dial-by-name is to be provided. Each data entry is preferred to contain the name of the user, the telephone number which can be dialed to reach the user's telephone, the company department of the user, the user's location (e.g. building post number), and whether the user is the primary user of the particular phone number. The directory is used by the switching system to provide call-by-name features to users of the system. (Call-by-name is a telephone feature which enables a telephone user to use the telephone's keypad to indicate the name of a user which is to be called, in contrast to dialing the user's extension number).

The peripheral controller, receiving the dialed (keyed) digit or character signals, sends a message via the message network to the controller to access the directory data entry corresponding to the dialed signals, to extract the phone number of the dialed user, and to send a message back to the circuit switch 11 to connect the subscriber's line via the peripheral controller or controllers to the dialed user's peripheral. The data entry in directory memory 7 can be accessed by either full number or dial-by-name.

Each switching system 23 generally duplicates the hardware of switching system 1, including directory memory 7.

In accordance with the present invention a central management system 25 is utilized, also connected to network 21. In accordance with a preferred embodiment, the central management system is comprised of a computer 27 having a directory memory 29 connected thereto. The directory 29 contains a consolidated copy of each of the directories contained in directory memories 7 of each switching system.

A more detailed understanding of the preferred embodiment of the invention will be obtained by reference to FIG. 2. Directory memories of three switching systems connected to network 21 are designated 7A, 7B and 7C respectively. The memories are shown figuratively linked to memory 29 by network 21, although it will be understood that the memories are not directly linked via the network 21; the network 21 is shown in FIG. 2 for the purpose of illustrating relationships.

Directory memory 7A, for example, may be contained in a switching system in Ottawa, directory memory 7B in a switching system in Hamilton. Other directory memories are contained in other switching systems connected to the network, e.g. directory memory 7C in Toronto. Directory memory 7A, for example, contains directory data entries $31_1$, $31_2$ $31_N$. These are the data entries relating to N subscribers of the Ottawa PABX or another switching system. A representative data entry 31 is magnified to show its contents, which are similar to the contents referred to above, i.e. the name of the user, the telephone number which can be dialed to reach the user's telephone, the user's department, the user's location and whether the user is the primary number of the telephone number. A PABX location, e.g. a free text designator such as "5th floor, pillar G1" may also be used, although this designator may be dispensed with.

The directory of data entries $31_1$–$31_N$ is created at the local PABX or other switching system, and can be created by an operator, for example.

When a new directory data entry or a group of new directory data entries are to be entered, or data entries have been changed, relating to the local switching system, controller 3 via message switch 13, peripheral controller and network interface 19, notifies the central management system. The central management system establishes the connection and the new or changed data entries $31_1$–$31_N$ are uploaded and are stored and consolidated by central management system 25 in its directory memory 29. Since each of the switching systems connected to the network perform in a similar manner, all of the directory data entries of all of the switching systems are stored and consolidated in the directory memory 29, each with central management system data and a designation of a single switching system or group (e.g. Ottawa, GPN, GP1, etc.). The directory data entries of Ottawa are shown as data entries $33_1$–$33_N$, the directory data entries of the Toronto switching system are stored as data entries $41_1$–$41_N$, and the directory data entries of the Hamilton switching system are stored as data entries $43_1$–$43_N$.

Any directory data entries which are common between two or more switching systems are stored as a single directory data entry that references a group of switching systems. For example, if directory data entries, $31_1$, $41_2$ and $43_1$ are identical then only one entry is stored on the central management system. Furthermore, each directory data entry references a group (e.g. GP1, GP2, GPN) of switching systems, for example GP2 consisting of Ottawa, Toronto and Hamilton. Directory data entries are considered identical if the directory data entry key is duplicated.

Each group record is shown as 39, 45, 47. A representative directory data entry for the central management is shown as 33.

When the data entries are uploaded, a switching system source identifier 42 is presented to the management system. This identifier Y is shown stored with each data entry (Ottawa, Toronto, Hamilton) in the management system directory memory 29, but could alternatively be stored as a single entry identifying a group of data entries by memory locations or the like.

Thus in accordance with the present invention, the various data entries are grouped into groups of communities of interest. For example, there could initially be a group referred to as "Ontario" which includes the switching systems in Ottawa and Toronto. In this case, in the preferred embodiment, an "Ontario" group headed GP1 and referenced 39 is created and stored in memory 29. GP1 contains references to the Toronto and Ottawa switching systems. Any directory data entries which are duplicated between Ottawa and Toronto will appear only once in the central management system and will reference group 39, "Ontario" GP1.

If the central management system operator modifies all of Toronto's data entries $41_1$–$41_N$ to reference GP1 instead of Toronto, the management system is caused to download the Toronto data entries $41_1$–$41_N$ to the Ottawa switching system, where they are stored in directory memory 7A as directory data entries $41_1$–$41_N$ as shown in memory 7A. As a result, local Ottawa users of switching system 1 can utilize the dial-by-name facility, or any other services which utilize the directory data entries, to access the directory data that was previously only resident in the Toronto switching system.

In case a new switching system has been added to the network, e.g. the Hamilton switching system having directory memory 7B, with local directory data entries $43_1$–$43_N$, once those data entries have been created they may be uploaded as described above and are stored in data memory 29, as directory data entries $43_1$–$43_N$. Each entry contains a "Hamilton" designator or a pointer refers to all the Hamilton entries.

Assume now that the management system operator wishes to provide the dial-by-name facility of all the Hamilton users to both the Ottawa and Toronto users. In that case a new group 45, headed GP2 is created, which references all of the Toronto, Ottawa, and Hamilton switching systems. The system operator may modify the directory data entries with the designator referencing Hamilton to now reference the new group GP2.

In a special case, some of the users, as an example the one having data entry $41_N$ is restricted from having a community of interest with the Hamilton switching system. In that case the designator 42 for entry $31_N$ references "Ottawa", and not group 45. In addition, with the addition of the Hamilton switching system and the desire to allow the subscriber on the "Ottawa" switching system to access all of Toronto, all of Ottawa and all of Hamilton, the designator 42 of data entries 43, is changed from "Hamilton" to GP2, 45.

Another example is shown in which another group headed GPN, reference 47, is created which references the group of switching systems in Ottawa and Montreal, connected to the network. The user associated with data entry $31_2$ has its group number which designates GPN, reference 47.

With a change in, or addition of data in each of the switching systems uploaded to central management system 25, the group designator indicates which switching systems are to be updated with the data entry information. The management system, accessing the group list from memory 29, then automatically logs the changed directory data entries for subsequent downloading via the network to all of the specific switching systems indicated in each group. When the download occurs the data entry updates are received by the designated switching systems connected to the network, which update their own directory memories with the specific directory entries allocated for use by the local users.

It is preferred that the group number designation data should not be downloaded, since that data is redundant and is not required for use by the switching systems. In addition, the designation of the particular switching system stored with each data entry in memory 29 also need not be downloaded to the designated switching systems.

In case the data entries are changed to a group containing a switching system designator which had not been previously designated by the data entries, the newly designated data entries from memory 29 are downloaded to the switching system for storage in its local memory.

Thus it may be seen that when incorporating directory changes from remote switching systems, new communities of interest may be created when users are added or deleted from the remote switching systems. When a user name and number combination which already appear at the central management system is added at a remote switching system, the user name at the central management system may be associated with a different telephone directory group. For example, assume that the user name "Fred" is associated with a telephone directory group "Ontario" which contains network nodes Ottawa and Toronto. Incoming changes from the switching system "Hamilton" reveal that "Fred" has been added to the telephone directory at the remote (Hamilton) switching system. As a result of this change, "Fred" on the central management system is caused to be associated with a new telephone directory group which contains Hamilton, Ottawa and Toronto.

This can be accomplished automatically in one of two ways. Associate another telephone directory group (if one exists) which contains the three nodes Ottawa, Hamilton and Toronto, e.g. 45, with "Fred" e.g. data entry $43_1$, $43_2$, $43_3$ . . . $43_N$. Thus "Ontario" GP1 is replaced by another telephone directory group GP2.

Alternatively, a new telephone directory group GP2 can be established which contains the three nodes (Ottawa, Hamilton and Toronto) and the new group associated with "Fred".

It should be noted that the system should not automatically add "Hamilton" to the "Ontario 39" group GP1 because Ontario may be associated with other telephone directory entries which are to only be available from Toronto and Ottawa.

When a user, name and number combination which is associated with a telephone directory group at the central management system is deleted from a remote switching system connected to the network, the telephone directory group at the central management system should be replaced with another group which reflects the changed community of interest, in a manner as described above. The above groups can be created either automatically or manually at the central management system.

To summarize, to associate a telephone directory entry with a different telephone directory group, at the central management system the telephone directory data entry is located and its associated telephone directory group is modified. The old community of interest group is compared to the new, and the switching systems affected are updated. Preferably the telephone directory entry is deleted from those switching systems that were in the old community, but not in the new, and the telephone directory entry should be added to those switching system directory memories that are in the new community but are not in the old.

To delete a telephone directory entry, at the central management system the entry is located and removed. Based on the telephone directory group which was associated with a telephone directory entry, the telephone directory entry is deleted from the switching systems on which it appears. To add a new telephone directory entry, at the central management system, the entry is added and associated with a telephone directory group or simply a switching system. The telephone directory entry is added to all switching system directory memories contained within the telephone directory group or simply added to the singular switching system it is associated with.

To modify the "key fields" (user name or number) of a telephone directory entry, at the central management system, the entry is modified. Since the key field has changed, the old telephone directory entry should be deleted from all network switching systems contained within the associated directory group. The new telephone directory entry is added to all switching systems contained within the associated telephone directory group.

To modify the "non-key fields" (not the user name and number) of a telephone directory entry, the entry should be modified at the central management system. The telephone directory entry at all network switching systems contained within the associated telephone directory group should then be modified automatically in a manner described above.

To incorporate telephone directory changes from switching systems connected to the network, the telephone switching changes should be collected from the remote switching systems. If a change is a deletion, the telephone directory entry should be located in the management system directory memory. If it is associated with a telephone directory group, it should be associated with a new telephone directory group which reflects a new community of interest. If it is an addition, the telephone directory entry should be located in memory 29. If the entry exists, it should be associated with a new telephone directory group which reflects a new community of interest. If a telephone directory group with the desired membership does not already exist, a new telephone directory should be created. Furthermore, if the non-key data of the new record has changed from that in the existing record on the central management system the members of the original group should have the directory data information for this record updated. If the entry does not exist, it should be added. If it is a modification of a telephone directory entry, the telephone directory entry should be located in memory 29 and modified. If the entry is associated with a telephone directory group, the changes should be propagated to the other switching systems which are members of the associated telephone directory group.

If a switching system connected to the network is to be added to the group, all telephone directory entries which reference the group should be propagated to the switching system which has been added to the group. If a switching system connected to the network is deleted from a group, all telephone directory entries which reference the group should be deleted from the switching system.

There are various ways of propagating new entries, modified entries, or deletions of data entries to the various switching system directories. While one of the ways is to address specific data entries for modification, and which could be used to implement the invention, another way is to simply overwrite the data entries, wherein all of the entries referencing a switching system directly or via a group are transmitted from the management system to the switching system. All of the data entries, including those which do not require updating, are thus replaced.

While the above description has been directed to a central directory management system for telephone switching systems connected in a network, it can also be used to control central management systems which manage other management systems. The invention is not specific to telephone directory management and can be used in the centralized management of any global network data which has the same management requirements as those described above. Thus the terms "switching system" and "directory data" both in this disclosure and claims should not be construed to be limited to telephone systems and telephone system users, but Should be construed to mean alternatively or in addition data handling systems and service data respectively.

The invention could also handle a global management system in which everything is controlled from a central management system, and changes initiated at the various switching systems connected to the network are forbidden or are ignored.

A person understanding this invention may now conceive of alternative structures and embodiments or variations of the above. All of those which fall within the scope of the claims appended hereto are considered to be part of the present invention.

We claim:

1. A method of maintaining telephone directory data in a switching system network having plural switching systems and a centralized telephone directory data management system comprising the step of:
   (a) storing local telephone directory data in a memory contained in each of said switching systems,
   (b) storing a copy of said local telephone directory data of all of said switching systems in a memory contained in said management system,
   (c) associating telephone directory data entries of telephone directory data stored at said management system with designated groups of switching systems, and
   (d) downloading, from said management system, data entries associated with respective designated groups of switching systems to the switching systems in said respective designated groups.

2. A method as defined in claim 1, wherein the downloading step further includes the step of determining whether a data entry has been associated with a group which contains a particular switching system, and refraining from downloading said data entry to the particular switching system if said data entry has previously been associated with said group.

3. A method as defined in claim 1, further comprising the step of over-writing each entry of telephone directory data stored at a particular switching system corresponding to downloaded data entries if the corresponding data entries already exist at the particular switching system.

4. A method as defined in claim 1, further comprising the steps of:
   (e) modifying a stored directory data entry at a switching system,
   (f) uploading the modified data entry to said management system,
   (g) modifying the copy of directory data at said management system,
   (h) determining which group is referenced by the modified data entry,
   (i) downloading, from said management system, the modified data entry to the switching systems in said referenced group, and
   (j) over-writing a corresponding data entry at each switching system in said referenced group with the modified data entry.

5. A method as defined in claim 1, further comprising the steps of:
   (e) modifying a stored directory data entry at said management system,
   (f) determining which group is referenced by the modified data entry,
   (g) downloading, from said management system, the modified data entry to the switching systems in said referenced group, and
   (h) over-writing a corresponding data entry at each switching system in said referenced group with the modified data entry.

6. A method as defined in claim 1, further comprising the steps of:
   (e) entering a directory data entry at a switching system,
   (f) uploading the directory data entry to said management system,
   (g) comparing the uploaded data entry with previously stored data entries, (h) if the event the data entry was not previously stored, associating it with an identity. Of a switching system from which it was uploaded, (i) if non-key data of a particular data entry is changed, downloading, from said management system, the particular data entry to the switching systems in a group with which the particular data entry is to be associated, and (j) over-writing a data entry at each switching system in which a corresponding data entry already exists, with the downloaded particular data entry and changed key data.

7. A method as defined in claim 1, further comprising the steps of:

(e) deleting a directory data entry at the switching system, (f) uploading data entry delete data to the central management system, (g) determining which group the data entry to be deleted references, (h) deleting a corresponding directory data entry at the management system, and (i) if said corresponding directory data entry references a different group, reassigning the corresponding director data entry to said different group.

8. A method as defined in claim 1, further comprising the steps of:

(e) receiving a directory data entry delete command at the management system, (f) determining which group the data entry to be deleted references, (g) downloading, from said management system, a delete directory data command to each of the switching systems in the group referenced by the entry to be deleted, and (h) deleting the directory data entry to be deleted at the management system.

9. A method as defined in claim 1, further comprising the steps of:

(e) receiving a command at the management system to associate a directory data entry with a different group of switching systems than the group of switching systems with which the data entry had been associated, (f) comparing said different group of switching systems with the group with which the data entry had previously been associated, (g) modifying the group designation of the data entry at the management system to that of the different group, and (h) downloading, from said management system, a delete data entry command to the switching systems in the group to which the data entry previously belonged which are not included in said different group, and downloading, from said management system, the directory data entry to switching systems of said different group which were not included in the group to which the data entry previously belonged.

10. A method as defined in claim 1, further comprising the steps of:

(e) adding an existing new switching system to a group of switching systems, and (f) downloading, from said management system, directory data entries that reference the group to the new switching system.

11. A method as defined in claim 1, further comprising the steps of:

(e) creating identification of a new group of switching systems at the management system, (f) recording reference to the identification of the new group in a data entry at the management system, (g) determining whether any switching systems are referenced in the new group, and (h) downloading, from said management system, the data entry to any switching system which it has been determined was not referred to in any other group which contains reference to said data entry.

* * * * *